(12) United States Patent
Kottilingal et al.

(10) Patent No.: US 8,971,883 B2
(45) Date of Patent: Mar. 3, 2015

(54) REGISTRATION TIMER ADJUSTMENT BASED ON WIRELESS NETWORK QUALITY

(75) Inventors: Sudeep Ravi Kottilingal, San Diego, CA (US); Ramesh Ramaswamy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 947 days.

(21) Appl. No.: 11/557,448

(22) Filed: Nov. 7, 2006

(65) Prior Publication Data

US 2008/0108348 A1    May 8, 2008

(51) Int. Cl.
*H04B 17/00* (2006.01)
*H04W 4/00* (2009.01)
*H04W 28/18* (2009.01)
*H04L 29/08* (2006.01)
*H04L 29/06* (2006.01)
(Continued)

(52) U.S. Cl.
CPC ............. *H04W 28/18* (2013.01); *H04L 67/322* (2013.01); *H04L 67/14* (2013.01); *H04L 67/04* (2013.01); *H04L 69/28* (2013.01); *H04L 67/143* (2013.01); *H04L 67/147* (2013.01); *H04W 24/00* (2013.01); *H04W 60/00* (2013.01); *H04L 65/1006* (2013.01); *H04L 65/1073* (2013.01)
USPC ..................................... 455/435.1; 455/67.13

(58) Field of Classification Search
CPC ............................. H04W 76/068; H04W 60/04
USPC ................ 455/433, 435.1, 422.1, 552.1, 67.1
See application file for complete search history.

(56) References Cited

U.S. PATENT DOCUMENTS

| 2003/0123396 | A1* | 7/2003 | Seo et al. | 370/252 |
| 2003/0186681 | A1* | 10/2003 | Gabor | 455/411 |
| 2003/0212912 | A1* | 11/2003 | Bajko et al. | 713/202 |

(Continued)

FOREIGN PATENT DOCUMENTS

| CN | 1589540 A | 3/2005 |
| CN | 1650569 A | 8/2005 |

(Continued)

OTHER PUBLICATIONS

Handley et al. : RFC 2543, "SIP: Session Initiation Protocol" March 1999, pp. 1-153.

(Continued)

*Primary Examiner* — Opiribo Georgewill
(74) *Attorney, Agent, or Firm* — Kristine U. Ekwueme

(57) ABSTRACT

The disclosure is directed to managing registration of a wireless communication device (WCD) operating in a wireless network. The WCD may support registration according to a signaling protocol, such as session initiation protocol (SIP). The WCD adjusts a registration timer based on network quality experienced by the WCD. When network quality is poor, for example, the WCD reduces the length of the registration timer. Reduced network quality may indicate that the WCD is at risk of losing network coverage. By reducing the length of the registration timer when network quality is degraded, stale registrations for out-of-coverage WCDs can be reduced. In particular, the shortened registration timer will expire more quickly, permitting the registration to be cleared more quickly. Consequently, the amount of call forwarding and other resources devoted to stale registrations can be reduced. If the WCD retains network coverage, it can maintain a registration by sending another registration request.

41 Claims, 5 Drawing Sheets

(51) Int. Cl.
*H04W 24/00* (2009.01)
*H04W 60/00* (2009.01)

(56) References Cited

U.S. PATENT DOCUMENTS

| | | | |
|---|---|---|---|
| 2004/0106401 A1* | 6/2004 | Ormson | 455/423 |
| 2005/0096053 A1* | 5/2005 | Liu et al. | 455/439 |
| 2005/0239489 A1 | 10/2005 | Qian et al. | |
| 2005/0239498 A1* | 10/2005 | Dorenbosch et al. | 455/552.1 |

FOREIGN PATENT DOCUMENTS

| | | |
|---|---|---|
| EP | 1315390 A1 | 5/2003 |
| JP | 5130019 A | 5/1993 |
| JP | 2005510175 A | 4/2005 |
| JP | 2006254093 A | 9/2006 |
| TW | I224933 | 12/2004 |

OTHER PUBLICATIONS

International Search Report and Written Opinion—PCT/US2007/083959, International Search Authority—European Patent Office—Mar. 26, 2008.

Rosenberg J et al:RFAC 3261: "SIP: Session Initiation Protocol" 20020601; 20020600, Jun. 1, 2002, pp. 1-270, XP015009039.

Taiwan Search Report—TW096142166—TIPO—Jun. 1, 2011.

* cited by examiner

REGISTRATION TIMER ADJUSTMENT BASED ON WIRELESS NETWORK QUALITY

TECHNICAL FIELD

The disclosure relates to wireless communication and, more particularly, techniques for managing registration of wireless communication devices (WCDs) within a wireless network.

BACKGROUND

Session Initiation Protocol (SIP) is an application layer signaling and control protocol for establishing and managing delivery of Internet Protocol (IP)-based telephony services in a packet-based network. SIP provides user authentication, redirect and registration services, and can be used to support a variety of telephony services such as audio or video conferencing, text messaging, interactive gaming, and call forwarding. The SIP protocol is described in Request for Comment (RFC) 3261, published in 2002, and prepared by the Internet Engineering Task Force (IETF).

SIP provides several functions for the setup, modification, and termination of sessions. The functions include registration, feature negotiation, and call management. The registration function enables a client to discover its current location within a network. A SIP registrar processes registration requests for the purpose of updating a location server with location information for a client specified in the request. The registrar updates the location server by writing a binding between a universal resource identifier (URI) and an IP address associated with the client.

The registration function allows the SIP network to locate clients. For example, when an client launches a messaging application, the client sends a register message to the registrar. The register message includes the URI for the client, the IP address of the client, and a registration timer. The registrar stores the binding between the URI and the IP address for the duration of the registration timer. Typically, a registration is valid for a predetermined period of time, e.g., 3600 seconds. In order to guarantee that the client is reachable, the client re-registers prior to the expiration of the registration timer.

SUMMARY

In general, the disclosure is directed to techniques for managing registration for a wireless communication devices (WCD) operating in a wireless network. The techniques may be executed in a mobile WCD that supports registration according to a signaling protocol, such as SIP, for creating, modifying, and terminating sessions. The WCD may include a registration module that adaptively adjusts a registration timer based on network quality experienced by the WCD. When network quality is poor, for example, the WCD reduces the length of the registration timer and communicates the reduced-length registration timer to network equipment, such as a registrar.

Network quality may vary as a function of the location of the WCD within the wireless network. As the WCD moves, the distance between the WCD and network equipment may change, and the WCD may be exposed to different physical or environmental conditions, or different network traffic, each of which may result in changes in network quality. Reduced signal strength, increased fading, or other adverse signal characteristics may undermine the ability of the WCD to reliably receive and/or transmit wireless signals. Reduced network quality may indicate that the WCD is at risk of losing network coverage.

By reducing the length of the registration timer when network quality is degraded, the number of stale registrations for out-of-coverage WCDs can be reduced. In particular, the shortened registration timer will expire more quickly, permitting the network to clear the registration more quickly following coverage loss. Consequently, the amount of call forwarding and other resources devoted to stale registrations can be reduced, permitting more efficient utilization of resources within the wireless network. If the WCD retains network coverage, it can maintain registration, despite the shortened registration timer, by sending a re-registration request to renew the registration.

In one embodiment, the disclosure provides a method comprising determining network quality for a wireless communication device (WCD) operating on a wireless network, and adjusting a registration timer associated with registration of the WCD on the wireless network based on the network quality.

In another embodiment, the disclosure provides a device comprising a network quality module that determines network quality for a wireless communication device (WCD) within the wireless network, and a registration module that adjusts a registration timer associated with registration of the WCD on the wireless network based on the network quality.

In an additional embodiment, the disclosure provides a machine-readable medium comprising instructions to cause a processor to determine network quality for a wireless communication device (WCD) operating on a wireless network, and adjust a registration timer associated with registration of the WCD on the wireless network based on the network quality.

The techniques described in this disclosure may be implemented in hardware, software, firmware, or any combination thereof. If implemented in software, the techniques may be realized in part by a machine-readable medium comprising program code containing instructions that, when executed, performs one or more of the methods described herein. The techniques described in this disclosure may be implemented at least in part in circuitry, which may be embodied by a chip or chipset suitable for incorporation in a WCD. In some embodiments, the disclosure is directed to a WCD that incorporates such circuitry.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
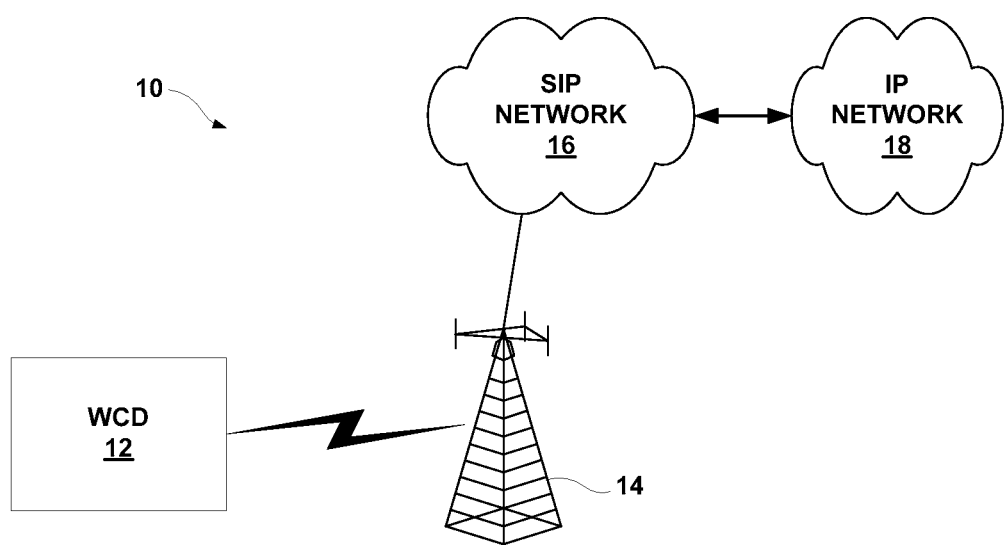
FIG. 1 is a block diagram illustrating a wireless network supporting SIP-based telephony services.

Network quality may vary as a function of the location of a WCD within a wireless network. As the WCD moves, for example, the distance between the WCD and network equipment may increase, and the WCD may be exposed to different physical or environmental conditions, or different network traffic, each of which may result in changes in network quality. Reduced signal strength, increased fading, or other signal characteristics may adversely affect the ability of the WCD to reliably receive and/or transmit wireless signals. Reduced network quality may indicate that the WCD is at risk of losing network coverage.

Network quality may be determined in any of a variety of ways, using any of a variety of different parameters, measurements, or metrics. A reduction in network quality indicates an increased risk that a WCD may lose network coverage. In the case of SIP-based communication, network equipment may maintain a registration even though a mobile WCD is out of coverage. A registration may generally refer to association between the WCD and information that permits location of the WCD within the network. For example, in some embodiments, the registration may include a binding between a universal resource identifier (URI) and an IP address associated with the client.

For purposes of illustration, the disclosure will generally refer to SIP registration. Registration is ordinarily maintained by a registrar according to a registration timer specified by the registering device. Hence, even though a WCD may be out of coverage, its association with a registrar server continues to be active until the registration timer expires. A registration for an out-of-coverage WCD may be referred to as a "stale" registration. Stale registrations are invalid and may result in inefficient consumption of network resources, such as attempted call forwarding to devices that are no longer accessible due to loss of coverage.

In general, the disclosure is directed to techniques for managing registration of a wireless communication devices (WCD) operating in a wireless network. The techniques may be executed in a mobile WCD that supports registration according to a signaling protocol, such as SIP, for creating, modifying, and terminating sessions. The WCD may include a registration module that adaptively adjusts a registration timer based on network quality experienced by the WCD. When network quality is poor, for example, the WCD reduces the length of the registration timer and communicates the reduced-length registration timer to network equipment, such as a registrar.

To initiate registration, an initial registration request may include a default registration timer or a registration timer that is adjusted based on network quality at the time of registration. As network quality changes, the WCD may send re-registration requests with adjusted registration timers. The registration timers may be increased or reduced as function of network quality, providing a registration timer that is adaptive to network conditions.

By reducing the length of the registration timer when network quality is degraded, the number of stale registrations for out-of-coverage WCDs can be reduced. In particular, the shortened registration timer will expire more quickly, permitting the registrar to clear the registration more quickly. Consequently, the amount of call forwarding and other resources devoted to stale registrations can be reduced, permitting more efficient utilization of resources within the wireless network. If the WCD retains network coverage, it can maintain registration, despite the shortened registration timer, by sending a re-registration request to renew the registration.

FIG. 1 is a block diagram illustrating a wireless network 10 supporting SIP-based telephony services. In the example of FIG. 1, WCD 12 interacts with a wireless base station 14 to access a SIP network 16 and an IP network 18 to transact SIP-based telephony services such as audio conferencing, video conferencing, text messaging, interactive gaming, and call forwarding. WCD 12 may communicate with other telecommunication devices, including wireless or wired devices, via base station 14, SIP network 16 and IP network 18. As WCD 12 moves, it may switch wireless coverage from base station 14 to other base stations. Hence, the access network by which WCD 12 access SIP network 16 and IP network 18 may change, resulting in a change in the location and IP address of the WCD. When coverage changes, WCD 12 may need to re-register via a new access network to ensure maintenance of existing sessions or initiation of new sessions. At the same time, a previous registration may remain active for WCD 12, resulting in a stale registration.

Figure 2:
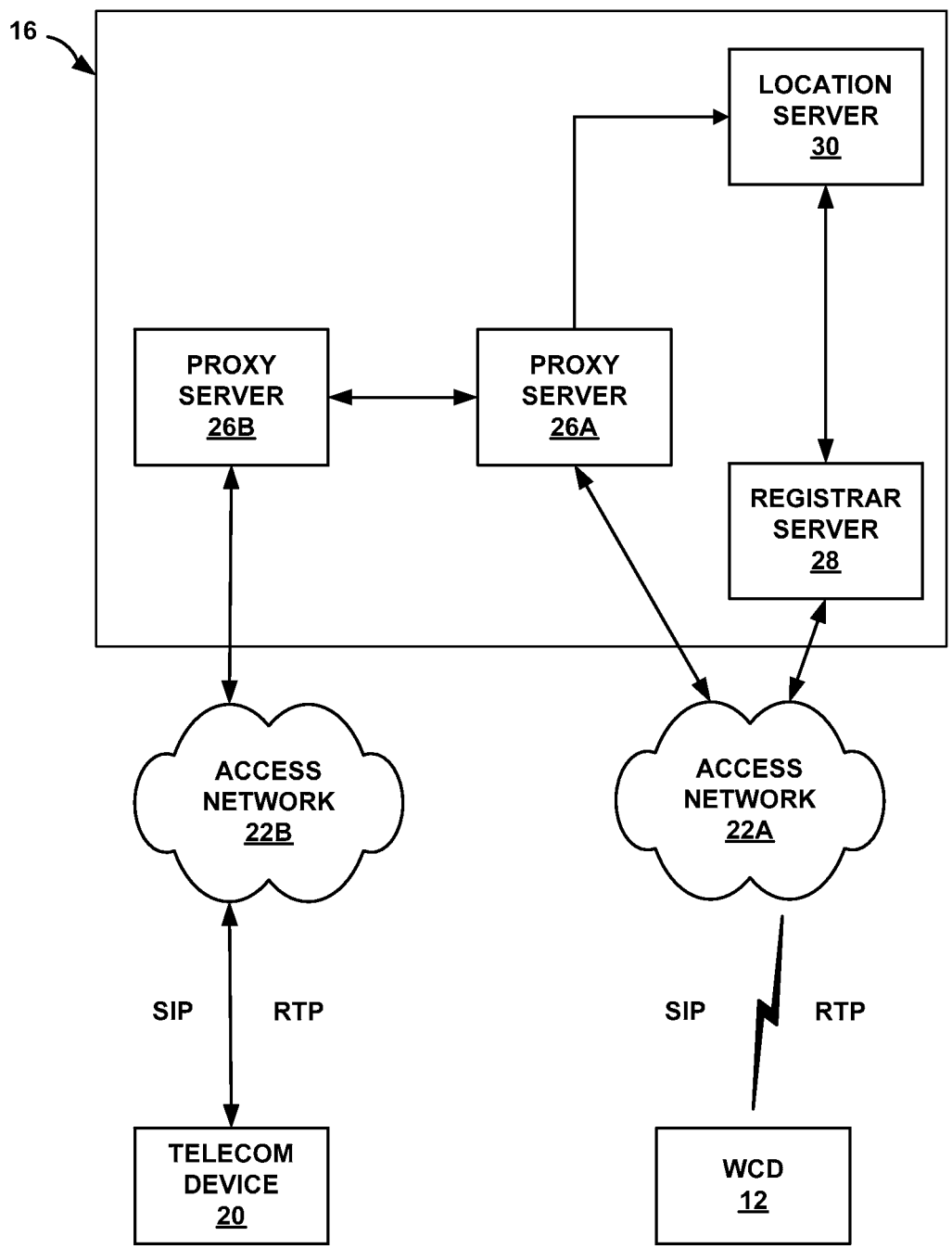
FIG. 2 is a block diagram illustrating SIP infrastructure for management of communication with a WCD.

FIG. 2 is a block diagram illustrating SIP network 16 for management of communication with a WCD 12 as shown in FIG. 1. SIP network 16 is embedded in or otherwise coupled to a packet-based communication network, such as IP network 18 of FIG. 1. In the example of FIG. 1, WCD 12 communicates with a telecommunication device 20 using a SIP session administered by SIP network 16. In many cases, WCD 12 may communicate with more than one telecommunication device. For ease of illustration, however, FIG. 2 depicts communication between WCD 12 and telecommunication device 20. WCD 12 is coupled to SIP network 16 via access network 22A, e.g., via a base station 14 as shown in FIG. 1. Telecommunication device 16 is coupled to SIP infrastructure 10 via another access network 22B, which may be wired or wireless.

SIP network 16 includes proxy server 26A, proxy server 26B, registrar server 28, and location server 30, all of which are generally referred to as SIP network elements. Although registrar server 28 and location server 30 are shown as separate elements in the example of FIG. 2, they may be co-located with one another, e.g., within a common server. The various network elements exchange SIP messages to create, maintain, and terminate a session between WCD 12 and telecommunication device 20. Upon establishment of a SIP session, multimedia content may be exchanged between WCD 12 and device 20 in accordance with a media transport protocol such as real-time transport protocol (RTP).

WCD 12 may be any wireless device, such as a mobile radiotelephone or any other device incorporating wireless communication capabilities. Telecommunication device 20 may be any device incorporating wired or wireless communication capabilities, such as another WCD. In this disclosure, WCD 12 and telecommunication device 20 may be configured to support SIP or other signaling protocols for voice-over-Internet-protocol (VoIP) audio conferencing, video conferencing, text messaging, online gaming, and other packet-based telephony applications.

WCD 12 may communicate via access network 22A according to any of a variety of wireless radio access technologies (RATs) such as GSM, CDMA, CDMA 2000, WCDMA, CDMA 1xEV-DO, or the like. Alternatively, or additionally, WCD 12 may be equipped to communicate according to a wireless local area network (WLAN) protocol such as any of the protocols defined by the various IEEE 801.11x standards. Access network 22A may include a wireless base station that exchanges wireless signals with WCD 12 and provides a connection to other network clients or servers via a global packet-based core network such as the Internet, a wide area network (WAN), or a local area network (LAN), and/or the public switched telephone network (PSTN).

SIP provides an application layer request-response signaling protocol that defines a system of rules for creating, modifying, and terminating sessions over the Internet. SIP is based on an HTTP-like request and response transaction model. Each transaction consists of a request that invokes a particular function and at least one response. SIP is independent of underlying transport protocols and the type of session that is being established. In other words, the details of data exchanged within a session, e.g., the encoding related to audio/video media, are not controlled by SIP. Instead, SIP is compatible with other protocols to build a multimedia architecture that can provide complete services to end users.

An important function of SIP is to deliver invitations to potential session participants regardless of where the participants are located. Hence, SIP allows a caller and a called party to contact each other to set up, modify, and end various types of communication flows. To that end, SIP uses a wide variety of protocols embedded within the secure datagram protocol (SDP), defining the content and characteristics of the messages, to complete a SIP session. Each protocol distinctly addresses the different aspects of the requirement.

The functions provided by SIP include name translation and user location, feature negotiation, and call participant management. The name translation and user location function is realized by a registration process supported by SIP, which enables a caller to locate a called party, i.e., an end user, without knowing the location of the called party. To permit the location of a called party to be identified, each end user uploads its current location whenever the end user registers with a network.

The registration process associates a universal reference identifier (URI) assigned to an end user with the network or IP address of the client device used by the end user. This association is referred to as a binding and is stored in a location server 30. A URI may take a form similar to an email address, including a username and a host name. When a call is initiated, the caller only knows the URI and does not know the IP address of the device used by the other party. To initiate a call with another party, the binding containing the URI assigned to the called party is retrieved from location server 30 and the associated network address is used to send SIP messages to the network address to set up the session.

In the example of FIG. 2, SIP network 16 includes two proxy servers 26A, 26B, a single registrar server 28, a single location server 30, and two endpoint clients, i.e., WCD 12 and telecommunication device 20. However, a SIP infrastructure may include any number of proxy servers, registrars, and location servers, as well as numerous endpoints. The registration techniques described in this disclosure may be executed by WCDs over any SIP infrastructure. Accordingly, SIP network 16 as shown in FIG. 2 is merely exemplary and should not be considered limiting of the invention as broadly described in this disclosure.

WCD 12 registers with registrar server 28 by sending a registration request with a registration timer that specifies the registration interval or lifetime of the registration. Registrar server 28 maintains the registration timer. Upon expiration of the timer, registrar server 28 permits the registration to be cleared from location server 30. In accordance with this disclosure, WCD 12 adjusts the registration timer associated with a registration request based on network quality experienced by the WCD. When network quality is poor, for example, the WCD reduces the length of the registration timer, thereby permitting the registration to expire more quickly, contributing to a reduction in stale registrations. Registrar 28 accepts registration requests from WCD 12 to update location server 30 with contact information for the user associated with WCD 12. In particular, registrar 28 writes a binding between the URI and the IP address included in a register request transmitted to location server via registrar server 28. Location server 30 includes a database containing a list of bindings. The bindings are used to forward calls to particular client devices, such as WCD 12 and telecommunication device 20, which may be distributed across a network.

In FIG. 2, WCD 12 and telecommunication device 20 may be located in different domains and operated by different end users. For example, a user named "Bob" may interact with an instant messaging application executing on telecommunication device 20 to call another user named "Melvin" who is logged into WCD 12. Again, telecommunication device 20 may be another WCD or any of a variety of wired or wireless communication devices, such as desktop computers, laptop computers, fixed telephones, or the like. WCD 12 registers with the network by sending a REGISTER request to registrar 28. Likewise, telecommunication device 20 registers with the network by sending a REGISTER request to either registrar 28 or another registrar.

In response to a REGISTER request from WCD 12, registrar 28 writes the binding between the URI assigned to Melvin, e.g., Melvin@mpls.com, and the IP address of WCD 12. The binding is stored in location server 30. Registrar 28 is typically co-located in the domain of the user. Thus, registrar 28 may be located within the same domain as Melvin, whereas a different registrar may be located within the same domain as telecommunication device 20. The pertinent registrar stores the binding for WCD 12 or telecommunication device 20 in location server 30.

The registered binding is active for a finite period of time specified in the REGISTER request submitted to registrar 28 by the client device, e.g., WCD 12. The finite period of time may be referred to as a registration timer in this disclosure, but is sometimes referred to as a registration lifetime or a registration interval. The registration timer is ordinarily selected to be one hour, i.e., 3600 seconds. In accordance with this disclosure, however, WCD 12 adjusts the registration timer as a function of network quality. In this manner, WCD 12 may reduce the number of stale registrations stored in location server 30, and thereby reduce devotion of network resources to stale registrations, i.e., registrations for connections that are no longer feasible due to loss of network coverage by WCD 12.

When a user interacts with a SIP-based application executing on telecommunication device 14 to place a call to Melvin over the Internet, it is necessary to determine the location of the WCD 12 operated by Melvin. In general, telecommunication device 14 does not know the location of Melvin and sends a request, e.g., an INVITE request, addressed to Melvin's URI. Proxy servers 26B and 26A act on behalf of telecommunication device 20 to facilitate the establishment of a session by exchanging SIP messages. Examples of SIP messages used to establish a session, as is well known in the art, include INVITE requests, ACCEPT or REJECT responses, ACK responses, and BYE messages.

In order to find WCD 12 (Melvin), proxy server 26B may consult a domain name service (DNS) (not shown) to find the SIP server (proxy server 26A) that serves Melvin's domain, i.e., mpls.com. Proxy server 26A may then receive SIP messages from proxy server 16B, and consults location server 30 to obtain the current IP address of WCD 12, i.e., the location of Melvin. The IP address can then be used to route the request to WCD 12 and enables telecommunication device 20 and WCD 12 to directly connect to each other. Consequently, a media flow can be established between telecommunication device 20 and WCD 12 during a call until one party decides to end the call.

Figure 3:
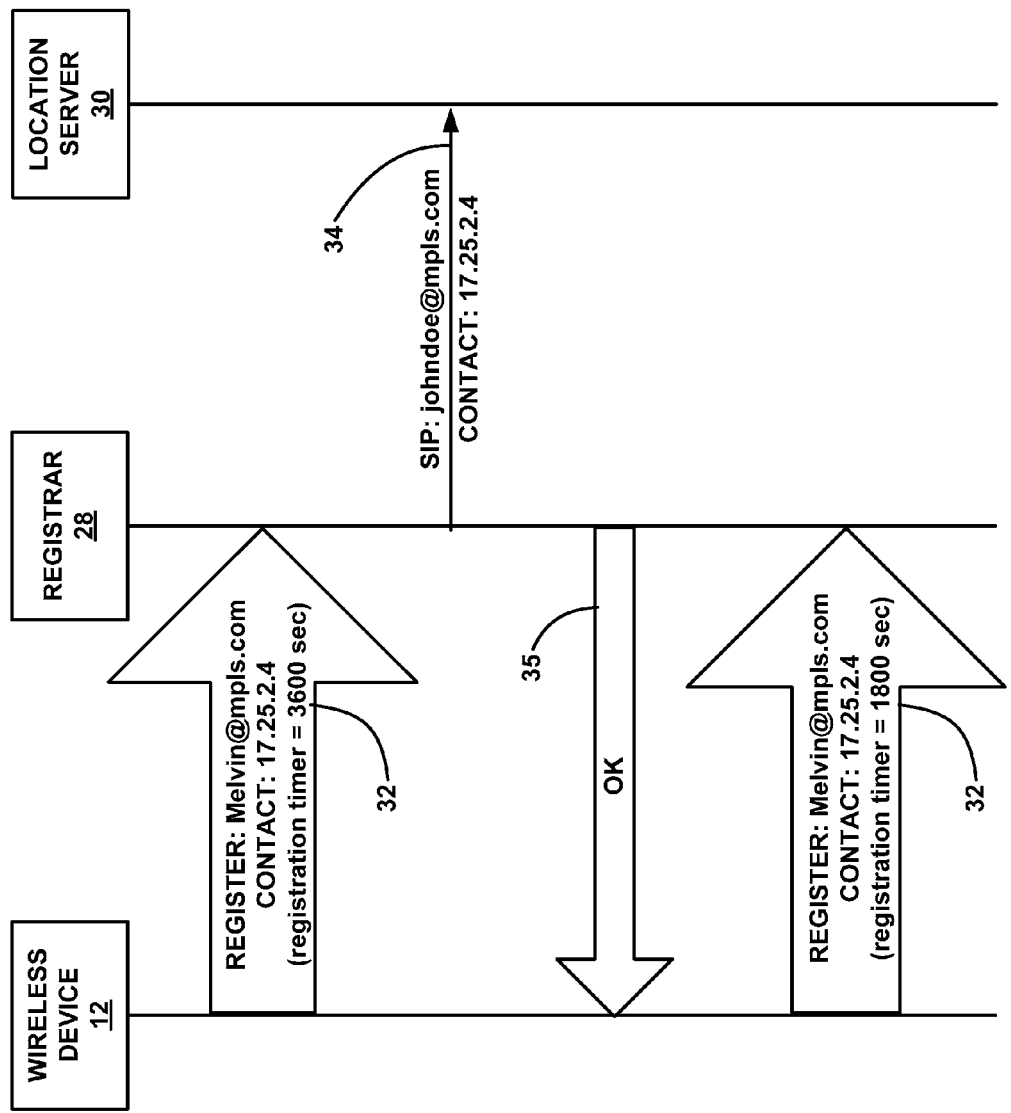
FIG. 3 is a diagram illustrating an exemplary call flow for registering a WCD in accordance with SIP.

FIG. 3 illustrates an exemplary exchange of SIP messages for registering a device, such as WCD 12. In the example of FIG. 3, WCD 12 executes a registration technique as described in this disclosure. In particular, WCD 12 generates a registration request with a registration timer, i.e., registration lifetime, that is adjusted as a function of network quality. In operation, WCD 12 performs a SIP registration function when connecting to an IP network. For example, WCD 12 may register upon launching an application requiring SIP registration. Alternatively, WCD 12 may register when it comes into the coverage area of a particular wireless access network 22A that is coupled to an IP network.

In order to register, WCD 12 transmits a registration message (REGISTER) to registrar server 28. The registration message includes the URI for the end user, the IP address of the corresponding WCD 12, and a registration timer that indicates how long the registration may be considered valid. Typically, as mentioned above, a registration is valid for approximately one hour, i.e., 3,600 seconds. The registration timer may, however, be set to a different pre-determined time interval. WCD 12 adjusts the registration timer as a function of network quality, as described in this disclosure.

To ensure that an end user is reachable, WCD 12 may re-register prior to the expiration of the registration timer. Thus, WCD 12 ordinarily may re-register approximately every hour when connected to an IP network. When WCD 12 closes an IP application, shuts down, or otherwise disconnects from the IP network, a message is sent to registrar 28 to clear the pertinent registration information in location server 30. Thus, if a call is placed to a user not registered with the network, the network can return a message to the caller indicating that the user cannot be found.

A user is not limited to registering from a single device. For example, a user may register with a network from a SIP phone at a home and a WiFi handset while away from home. Similarly, more than one user can be registered on a single device. For ease of illustration, however, this disclosure describes the registration function with respect to a single user and device, without limitation as to the use of multiple registrations for a particular user among several devices.

WCD 12 experiences changes in network quality as it travels within a wireless network. For example, WCD 12 may move within a given coverage region, and between different coverage regions within a wireless network. Network quality affects the likelihood that WCD 12 will experience a loss of service. Network quality may vary as a function of the location of the WCD 10 within the wireless network.

As the WCD 12 moves, the distance between WCD 12 and network equipment may change, and the WCD 12 may be exposed to different physical or environmental conditions, or different network traffic, each of which may result in changes in network quality. Reduced signal strength, increased fading, or other adverse signal characteristics may undermine the ability of WCD 12 to reliably receive and/or transmit wireless signals.

Reduced network quality may indicate that the WCD 12 is at risk of losing network coverage. In accordance with this disclosure, WCD 12 monitors network quality, e.g., by measuring received signals strength, error rate, or other parameters, and adjusts the registration timer based on the network quality. For example, when WCD 12 first registers, it may select a default registration timer, or a registration timer based on the network quality at the time the registration is requested. Additionally, or alternatively, when network quality degrades, WCD 12 may send additional re-registration requests with reduced registration timers. In this case, the registration maintained by location server 30 remains intact, but is reset with a new, reduced registration timer so that the registration expires more quickly in the event WCD 12 loses network coverage.

WCD 12 may register more frequently when network quality is poor, i.e., when WCD 12 is more likely to lose coverage, and register less frequently when network quality is good, i.e., when WCD 12 is less likely to lose coverage. In each case, the frequency of re-registration may be a function of the registration timer length. Although WCD 12 sets the registration timer to a shorter length when network quality is poor, WCD 12 is able to maintains a registration by re-registering more frequently, provided the WCD remains in coverage. When WCD 12 drops out of coverage, however, the registration timer expires more quickly, permitting the resulting stale registration to be cleared by SIP network 16.

FIG. 3 is a diagram illustrating an exchange of SIP messages for registering WCD 12 in accordance with SIP. Generally, the registration process creates bindings in location server 30 for a particular domain and associates a URI with a contact address, such as an IP address. A single URI may be associated with multiple contact addresses to support personal mobility. However, for ease of illustration, this disclosure refers to a URI associated with a single contact address.

In FIG. 3, the registration process uploads the contact information for WCD 12 to registrar 28. Registrar 28 writes the association between Melvin's URI (Melvin@mpls.com) and the IP address of WCD 12 to location server 30 for use by proxy servers 26A and 26B in locating WCD 12. FIG. 3 illustrates the exchange of messages between WCD 12, registrar 28, and location server 30 for registering WCD 12. The messages appear vertically in the order in which they are generated and processed. The direction of arrows indicates the sender and recipient of each message.

The transaction illustrated in FIG. 3 begins with WCD 22B sending an initial REGISTER request 32 to registrar 28. The REGISTER request contains Melvin's URI, Melvin@mpls.com, the contact address to which SIP requests addressed to the URI should be forwarded, i.e., the IP address of WCD 12, and a registration timer. The IP address, e.g., 17.25.2.4, is conveyed in the Contact header field. Registrar 30 writes the binding 34 between Melvin's URI and the IP address to location server 30, where it can be used by proxy servers in the mpls.com domain, such as proxy server 22A, to locate WCD 12. Upon writing the association to location service 26, registrar 28 sends an OK response 35 to WCD 12 to alert WCD 12 that the registration process is complete.

When a client sends a REGISTER request, it may suggest a registration timer in the form of an expiration interval that indicates how long the registration is valid. In the example of FIG. 3, the registration timer in REGISTER request 32 is 3600 seconds. Registrations are soft state and expire unless refreshed, but can also be removed explicitly. A registration may be explicitly removed when closing an application or shutting down a device. In particular, a binding may be removed by specifying an expiration interval of "0" for the contact address in a REGISTER request.

A client, WCD 12 in FIG. 3, can suggest an expiration interval for a binding through an Expires header field or an "expires" Contact header parameter. The latter allows expiration intervals to be suggested on a per-binding basis, when more than one binding is give in a single REGISTER request.

The former suggests an expiration interval for all Contact header field values that do not contain the "expires" parameter. Hence, the registration timer may be set in different ways. If neither mechanism for expressing a suggested expiration time is present in a REGISTER message, the server may set the registration timer to a default value.

As specified in RFC 3261, the registrar 28 may choose an expiration less than the requested expiration interval. If and only if the requested expiration interval is greater than zero and smaller than one hour and less than a registrar-configured minimum, registrar 28 may reject the registration with a 423 (Interval Too Brief) response. This response must contain a Min-Expires header field that states the minimum expiration interval the registrar 28 is willing to honor. Registrar 28 then skips any remaining steps.

Allowing the registrar 28 to set the registration interval protects it against excessively frequent registration refreshes while limiting the state that it needs to maintain and decreasing the likelihood of registrations going stale. The expiration interval of a registration is frequently used in the creation of services. An example is a follow-me service, where the user may only be available at a terminal for a brief period. In such cases, a registrar accepts brief registrations. A request should only be rejected if the interval is so short that the refreshes would degrade registrar performance.

The "expires" parameter indicates how long the registration is to be valid. The value is a number indicating seconds. If this parameter is not provided, the value of the Expires header field is used instead. Malformed values should be treated as equivalent to 3,600 seconds, i.e., one hour. However, in accordance with the registration techniques described in this disclosure, the expiration interval, which is indicated by the registration timer referred to in this disclosure, is explicitly adjusted by WCD 12 based on the network quality experienced by the WCD. For example, the registration timer in REGISTER request 32 may be a value different from 3600 seconds.

When a registration is initiated, WCD 12 may simply request a default registration timer of 3600 seconds. Alternatively, WCD 12 may determine network quality at the time registration is initiated, and adjust the registration timer to a shorter period of time based on the network quality. In either case, WCD 12 also may monitor network quality during the course of a registration, i.e., while the registration is active, and adjust the registration timer if network quality changes significantly. If network quality degrades, for example, WCD 12 may send another REGISTER request, which may be referred to as a re-registration request, with a shortened registration timer. As shown in FIG. 3, for example, WCD 12 sends another REGISTER request 37 to registrar 28 and set the registration timer to a shortened value of 1800 seconds.

In general, the described registration techniques involve determining the network quality for WCD 12 and adjusting the registration timer communicated with a REGISTER request based on the network quality. Again, the registration timer may be adjusted for the initial registration request and subsequent re-registration requests, or only for the re-registration requests. The re-registration requests may be transmitted at a predetermined time prior to expiration of the current registration timer, e.g., to keep the current registration active. Alternatively, or additionally, the re-registration may be transmitted any time a significant change in network quality is detected, possibly subject to predetermined lockout intervals between successive requests.

Monitoring network quality may, for example, comprise measuring received signals and, more specifically, measuring a parameter of the received signals, such as the power of the received signals. The power of received signals is ordinarily a good indication of network coverage, i.e., the likelihood that the WCD will lose connection with the network. Example power measurements include the received signal strength indicator (RSSI). Thus, in some embodiments, a WCD 12 may adjust the registration timer according to the measured power of received signals, e.g., based on an RSSI. The RSSI may be determined from pilot signals or other signals received over the wireless network.

WCD 12 may adjust the registration timer according to various algorithms. As an example, the registration timer may be adjusted to a pre-determined value when the measured parameter value is greater than a pre-determined threshold value and adjusted to a different pre-determined value that is less than the other pre-determined value when the measured parameter value is less than the pre-determined threshold value.

In another example, the registration timer may be similarly adjusted by comparing the measured value to more than one pre-determined threshold value. In this case, the pre-determined threshold values may correspond to pre-determined categorizations or qualities of network coverage. For example, network quality may be categorized as "poor," "good," or "excellent," which correspond to different ranges of network quality, such as different ranges of received signal strength When network quality is determined to be "poor," WCD 12 adjusts the registration timer to a shorter time such that registration expires more quickly. At the same time, the shortened registration time forces WCD 12 to re-register more frequently than when network quality if good or excellent. On the contrary, when network quality is determined to be "excellent," the registration timer may be adjusted to a longer time such that registration expires more slowly. In this case, WCD 12 re-registers less frequently than when network quality is good or poor.

In the above example, each range of network quality (poor, good, excellent) may have an associated registration timer length such that WCD 12 transitions between discrete timer lengths. Of course, network quality may be divided into a finer set of gradations, each having a different timer length. In each case, WCD 12 only adjusts the registration timer, and sends a re-registration request with the adjusted registration timer, if network quality transitions from one range to another.

In another example, the registration timer may be adjusted by WCD 12 to be proportional to the measured power of the received signals. In this case, a mathematical relationship between the power of received signals and the length of the registration timer may be established and expressed by a formula or a lookup table that correlates numerous network quality values to corresponding registration timer values. The registration timer may then be adjusted as a function of the measured power of the received signals.

The proportional approach provides a more smoothly varying registration timer, in contrast to the use of a small number of discrete registration timer values associated, e.g., with poor, good and excellent network quality. To avoid a high rate of re-registration requests, however, it may be desirable to require that the difference between successive network quality levels be above a threshold value to warrant an adjustment to the registration timer. In addition, a degree of hysteresis may be desirable to prevent frequent toggling of the registration timer length.

In some embodiments, adjusting the registration timer also may take in account the time remaining in a current registration. If network quality has degraded, for example, but the current registration timer only has a few minutes remaining, it may be desirable to adjust the registration timer at a time just prior to expiration of the current timer, e.g., less than five seconds from expiration. The timing of the re-registration request may depend on whether the network quality level has degraded or improved. When network quality is "good" and WCD 12 moves into an area of "poor" network coverage, the WCD may be configured to wait to re-register with the adjusted registration timer until the current registration nears expiration. When network quality transitions from poor to excellent, however, WCD 12 may be configured to re-register immediately with an increased registration timer.

Figure 4:
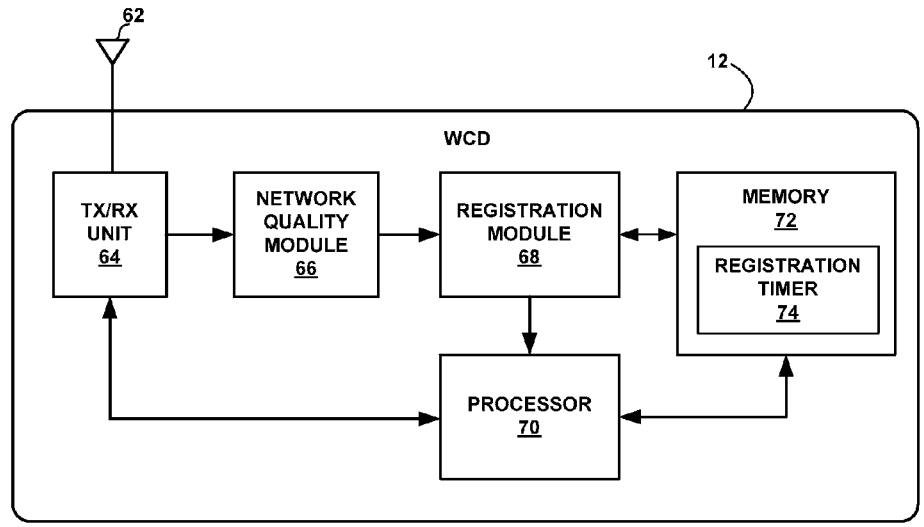
FIG. 4 is a block diagram illustrating an exemplary WCD equipped to manage registration of a WCD in accordance with an embodiment of this disclosure.

FIG. 4 is a block diagram illustrating example components of a WCD 12 configured to perform adaptive registration techniques as described in this disclosure. WCD 12 is capable of exchanging wireless signals with IP network 14 (FIG. 1) in accordance with SIP. As shown in FIG. 4, WCD 12 includes a radio frequency antenna 62 that receives and transmits wireless signals exchanged with an access network 16A (FIG. 2). WCD 12 also includes a wireless transmitter/receiver (TX/RX) unit 64, a network quality module 66, a registration module 68, a processor 70, and a memory 72 that stores a registration timer 74 for incorporation in SIP registration requests.

The various components illustrated in FIG. 4 may be realized in hardware, software, firmware, or any combination thereof. For example, some components such as registration module 68 and processor 70 may be realized as processes or modules executed by one or more microprocessors or digital signal processors (DSPs), one or more application specific integrated circuits (ASICs), one or more field programmable gate arrays (FPGAs), or other equivalent integrated or discrete logic circuitry. Memory 72 may comprise, for example, random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or the like, or any combination of such devices.

The features illustrated in FIG. 4 may be realized by any suitable combination of hardware and/or software components. Depiction of different features as units or modules is intended to highlight different functional aspects of WCD 12 and does not necessarily imply that such units must be realized by separate hardware and/or software components. Rather, functionality associated with one or more units may be integrated within common or separate hardware and/or software components. Thus, the disclosure should not be limited to the exemplary embodiment of WCD 12.

As previously described, WCD 12 may be any portable communication device configured to communicate over a wireless packet based communication network, such as a mobile wireless radiotelephone. In some embodiments, WCD 12 may be a so-called SIP phone, a soft phone, a personal digital assistant (PDA), or a WiFi handset or IP phone. Memory 72 stores computer-readable instructions that can be executed by a processor within WCD 12 to perform various aspects of the registration techniques described in this disclosure. WCD 12 also includes a power supply (not shown). In the case of a mobile WCD 12, the power supply may include a battery, such as a rechargeable battery.

TX/RX unit 64 transmits and receives wireless signals and includes appropriate analog and/or digital circuit components such as, for example, amplifiers, filters, frequency converters, modulator, demodulators, analog-to-digital conversion circuitry, digital-to-analog conversion circuitry, and digital modem circuitry. In operation, antenna 62 transmits and receives wireless signals on radio frequency bands supported by WCD 12. TX/RX unit 64 may be configured to support any desired radio access technology (RAT).

Processor 70 and TX/RX unit 64 may generally conform to any architecture that supports packet communication in accordance with SIP or other signaling protocols for session management. Processor 70 controls TX/RX unit 64 to transmit wireless signals and processes signals received by TX/RX unit 64 to support multimedia telephony as well as registration. In addition to packet-based telephony, WCD 12 may be configured to support conventional wireless telephony.

Processor 70 may be responsible for setting up, modifying, and terminating sessions, e.g., by exchanging SIP messages, with other devices in accordance with SIP. In particular, processor 70 may execute user agent client (UAC) and user agent server (UAS) processes to generate SIP requests and responses. For registration, processor 70 generates SIP messages, including registration requests with registration timers that are adjusted as a function of network quality.

Network quality module 66 determines network quality for WCD 12 within the wireless access network 16A (FIG. 2) and provides an indication of network quality to registration module 68. In some embodiments, network quality module 66 may reside within or process signals provided by TX/RX unit 64 in order to determine network quality. For example, network quality module 66 may determine network quality based on RSSI signals obtained within or from TX/RX unit 64. In other embodiments, network quality module 66 may monitor other network quality parameters, either at the physical layer, medium access control (MAC) layer, or the application layer of the stack executed by processor 70, in order to determine network quality.

Registration module 68 adjusts the registration timer 74 associated with registration of WCD 12 based on the network quality determined by network quality module 66. Registration timer 74 may be stored in memory 72 and updated continuously or periodically by registration module 68 based on the network quality determination made by network quality module 66. Registration module 68 may form a software process executing within a processor and may be integrated or otherwise interact with processor 70.

In operation, registration module 68 obtains the network quality determination made by network quality module 66. Based on the network quality, registration module 68 updates the registration timer 74 as described in this disclosure. For example, registration module 68 reduces the length of registration timer 74 when network quality is reduced. Registration timer 74 may be stored in memory 72 as a length of time or as an index value used by processor 70 to set a length of time as the registration timer transmitted with a registration request.

When a SIP registration is initiated or is about to expire, processor 70 retrieves registration timer 74 and includes it with a registration request or re-registration request to be transmitted to registrar 28 (FIG. 2) via TX/RX unit 64 and access network 16A (FIG. 2). In addition, registration module 68 may generate a signal, command or instruction that causes processor 70 to generate a re-registration request at any time that network quality is significantly degraded. In this manner, registration module 68 can adjust registration timer 74 and direct processor 70 to transmit a re-registration request to shorten the length of the registration for WCD 12 when network quality indicates that loss of coverage is more likely. Likewise, in some embodiments, registration module 68 may increase the length of registration timer 74 when network quality is improved.

As mentioned previously, registration module 68 may adjust registration timer 74 to one of several discrete levels based on a comparison of network quality to different threshold values, e.g., indicative of poor, good and excellent coverage. Alternatively, registration module 68 may adjust registration timer 74 to a level proportional to network quality, i.e., as a mathematical function of the network quality. Again, the mathematical function may be defined by a mathematical formula or a lookup table correlating different registration timer values with different network quality levels.

Network quality module 66 may monitor network quality continuously or at periodic intervals. Likewise, registration module 68 may process the network quality provided by network quality module 66 continuously or at periodic intervals. In either case, the periodic intervals will typically be substantially shorter than the then-current length of registration timer 74. The lengths of the periodic intervals may be generally fixed, or vary as a function of the current length of registration timer 74. Upon transmission of the registration or re-registration request by WCD 12, registrar 28 (FIG. 2) clears out the registration for the WCD upon expiration of registration timer 74, unless another re-registration request is received prior to expiration.

Processor 70 may generate a control signal, command or instruction that is received by registration module 68 when WCD 12 powers on, launches an IP application, such as an instant messaging application, or otherwise connects to IP network 14 (FIG. 1). In response, registration module 68 obtains the network quality indication from network quality module 66 and updates registration timer 74. Upon transmission of a registration request by WCD 12, registration module 68 may track registration timer 74 and initiate a re-registration request when the registration timer nears expiration, or when network quality changes significantly.

Registration module 68 may store a default value of 3,600 seconds as registration timer 74 when WCD 12 is not connected to IP network 14. During this time, registration module 68 and network quality module 66 may be inactive and processor 70 may execute instructions related to other functions provided by WCD 12. Registration module 68 and network quality module 66 may activate, for example, in response to receiving a control signal from processor 70 begin the registration process.

To initially register WCD 12 on IP network 14, registration module 70 generates a REGISTER message including the user's URI, IP address of WCD 12, and the expiration interval specified by registration timer 74. Specifically, registration module 70 retrieves the value stored in registration timer 74, and uses this value as the expiration interval in the REGISTER message. Registration module 68 outputs the REGISTER message to processor 70, which drives TX/RX unit 64 to transmit the message to registrar 28 in accordance with SIP. The initial value of registration timer 74 may be a default value, or be determined each time a SIP registration is initiated based on analysis of network quality by network quality module 66.

Registration module 68 may also generate a SIP message to clear registration information for WCD 12. Registration module 68 may execute instructions to carry out this process in response to receiving a control signal from processor 70. Processor 70 may generate this control signal in response to receiving a command from the end user or upon entering a "sleep" or "standby" mode after a period of inactivity. Upon receiving the control signal, registration module 68 may output the SIP message to processor 70 to drive TX/RX unit 64 for transmission to a registrar 28 on the network. Registration module 68 may also reset the value stored in registration timer 74 to a default value, e.g., 3,600 seconds, in response to receiving the control signal from processor 70.

Notably, the registration techniques described in this disclosure may be implemented in WCD 12 by simply loading a software revision or upgrade to WCD 12. In general, no additional hardware will typically be required. For example, network quality module 66 and registration module 68 may be programmable features of a processor within WCD 12. Software on the network side, such as software running on network servers operating as SIP elements, is unaffected. Consequently, the registration techniques described in this disclosure provide a cost effective solution for reducing the number of stale registrations in a wireless communication system using SIP or an equivalent protocol as a signaling protocol.

As an illustration of the adaptive registration operation of WCD 12, it is assumed that WCD 12 is first powered up and that VoIP application is launched. In this case, processor 70 requests a registration timer 74 from registration module 68 for inclusion in the initial registration request. In response, registration module 68 retrieves a network quality indication from network quality module 66 and adjusts registration timer 74 based on the network quality level. In this example, network quality is good, and registration module 68 adjusts the initial registration timer 74 to 1800 seconds, i.e., 30 minutes. Registration module 68 formulates a SIP REGISTER message for processor 70. Processor 70 then drives TX/RX unit 64 to send the SIP REGISTER message with a registration timer, i.e., expiration interval, of 1800 seconds.

After a registration has become active, network quality module 66 continues to monitor network quality, which is communicated to registration module 68. If registration module 68 detects a transition in network quality from good to poor, registration module 68 adjusts the registration timer downward to 900 seconds, i.e., 15 minutes, and generates a re-registration request for processor 70 to transmit via TX/RX unit 64. When registration module 68 detects a transition from poor to excellent, registration module 68 adjusts the registration timer upward to 3600 seconds, i.e., one hour.

This process may proceed on a continuous basis while the registration is active. As mentioned previously, changes to the registration timer may be subject to a variety or rules and conditions, such as lockout intervals to limit the frequency of changes, thresholds to permit changes only when network quality has changed significantly, hysteresis to prevent toggling of changes, and various limitations that can be imposed when the registration timer expiration is imminent. In general, registration requests with adjusted registration timer may be transmitted to reduce the impact of stale registrations while also moderating consumption of bandwidth by repeating registration requests.

Figure 5:
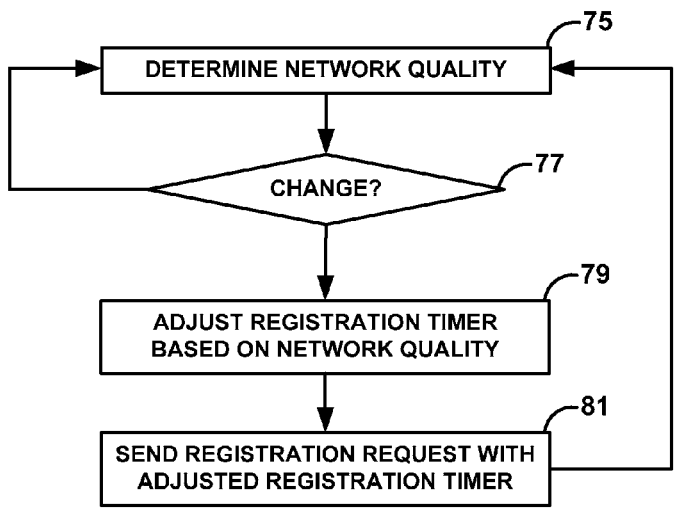
FIG. 5 is a flow diagram illustrating management of registration in accordance with an embodiment of this disclosure.

FIG. 5 is a flow diagram illustrating management of registration in accordance with an embodiment of this disclosure. As shown in FIG. 5, network quality module 66 determines network quality (75). If a change is detected (77), based on the determined network quality, registration module 68 adjusts the registration timer (79), and prepares a registration request with the adjusted registration timer. The registration timer is associated with a SIP registration for the WCD 12 on the wireless network, and the registration is terminated when the registration timer expires.

WCD 12 sends the registration request with the adjusted registration timer (81) to registrar 28 (FIG. 2) to set the expiration interval for a new registration, or change the expiration interval for a current registration. The process proceeds on a continuous or periodic basis so that the registration timer adapts to changes in network quality, permitting the impact of stale registrations to be reduced within SIP network 16. For example, network quality module 66 may periodically monitor network quality at intervals substantially shorter than the registration timer. A new registration request may be transmitted when the network quality changes by a predetermined amount.

Figure 6:
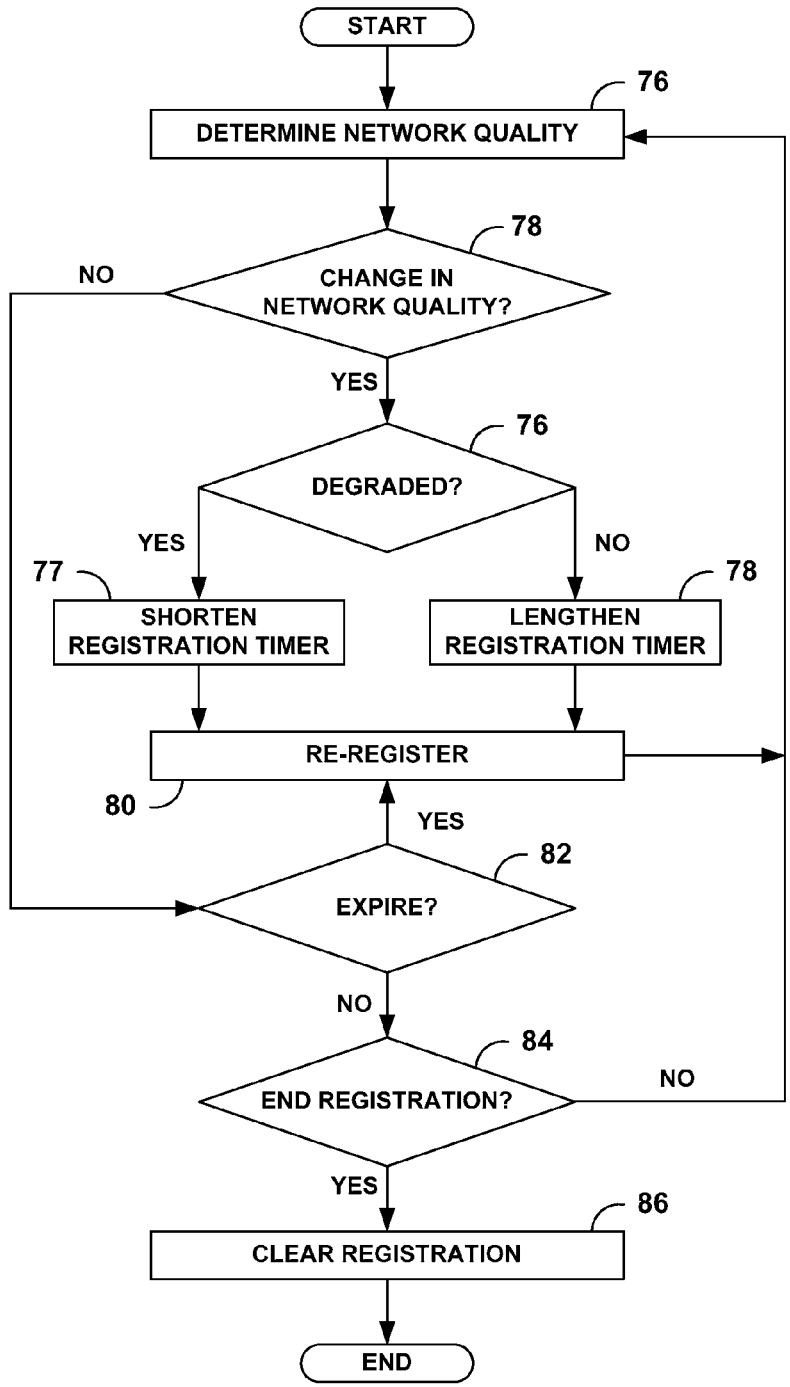
FIG. 6 is a flow diagram illustrating management of registration as shown in FIG. 5 in more detail.

FIG. 6 is a flow diagram illustrating an exemplary registration technique as shown in FIG. 5 in more detail. The registration technique may be executed within WCD 12. In operation, WCD 12 initially registers with a SIP network 16 (FIG. 2). For example, this initial registration may occur when WCD 12 is powered on from being in a standby or sleep mode or when dropping into coverage from being out of coverage. In any case, the initial registration process involves sending location information along with a registration timer to a registrar. The registration timer may be set to a default value, such as approximately one hour (3600 seconds). The flow diagram illustrated in FIG. 5 begins when WCD 12 is initially registered with the network.

When WCD 12 is registered with the network, network quality module 66 monitors wireless signals received by TX/RX unit 64 to determine network quality (76). As one example, network quality may be determined based on an RSSI parameter. As an example, the RSSI parameter may express network quality in terms of decibels, or a signal-to-noise ration. However, other parameters may be used to evaluate network quality. Network quality may be determined periodically. For example, network quality module 66 may monitor one or more network quality parameters, such as RSSI, at intervals of approximately less than one second, approximately 1-3 seconds, approximately 3-5 seconds, or intervals greater than approximately 5 seconds.

As shown in FIG. 6, registration module 68 uses the determined network quality to detect a significant change in network quality (78). For example, registration module 68 may compare the determined network quality to a previous network quality or to a pre-determined threshold to determine if the network coverage has degraded (76). If network quality has degraded significantly, registration module 66 shortens registration timer 74 (77). On the other hand, if the network coverage did not degrade but registration module 80 detected a change, the network coverage has improved. In this case, registration module 80 may maintain the current registration timer 64 in some embodiments, or lengthen the registration timer 64 (78) as indicated in the embodiment of FIG. 5. Shortening and lengthening registration timer 74 may, as previously described, include setting the registration timer to appropriate pre-determined values. Upon adjusting registration timer 74, WCD 12 sends a re-registration request (80). Registration module 68 and processor 70 may follow the steps generally illustrated in FIG. 3 to register WCD 12.

If registration module 68 does not detect a change in network coverage (no branch of step 78), registration module 68 may determine if registration timer 74 is about to expire (82). If registration timer 74 is about to expire, e.g., is less than five seconds from expiration, registration module 68 generates a registration request to re-register WCD 12 on the network (90). If registration timer 74 is not about to expire, registration module 70 determines if the registration should be ended (84).

Registration may be ended for a number of reasons. For example, registration may end if the user logs off of the network such as during a power down event, the user shuts down an application and associated media flow, or if registration information changes such as when the user moves to a new service provider in the network. In this manner, registration module 68 determines if any event has occurred that requires clearing registration information from the registrar.

If no such event occurs, WCD 12 continues to monitor network quality (76) and loops through the steps of the flow chart illustrated in FIG. 5. However, if WCD 12 logs off of the network or performs any other such event, registration module 68 communicates with the registrar to clear the registration (86) and the process ends. A registration may be cleared (86), e.g., by sending a re-registration request with a timer of zero seconds. When clearing registration information, registration module 68 may only clear a portion of the registration information. As an example, only one device associated with a user may be cleared or one IP address is cleared for a single device, such as a work address for a laptop, while the home address remains registered.

The techniques described herein may be implemented in hardware, software, firmware, or any combination thereof. Any features described as modules or components may be implemented together in an integrated logic device or separately as discrete but interoperable logic devices. If implemented in software, the techniques may be realized in part by a computer readable medium, such as a memory, comprising program code containing instructions that, when executed, performs one or more of the methods described above. In this case, the computer readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The program code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein.

Various embodiments have been described. For example, techniques for registering a wireless communication device operating in a wireless packet based communication network as network coverage changes. The techniques include adjusting a registration timer based on network coverage so that the duration of a valid registration is shorter when network coverage is poor than when network coverage is good. Adjusting the registration timer based on the network coverage can reduce the number of stale registrations while providing an efficient use of bandwidth. Further, the techniques also reduce the time which stale registrations remain in a registrar. The techniques have been described in the context of SIP registration, but may be applicable to other registration applications, such as domain name server (DNS) registration. These and other embodiments are within the scope of the following claims.

The invention claimed is:

1. A method for determining network quality and adjusting a registration timer, comprising:
   determining a network quality for a wireless communication device (WCD) operating on a wireless network; and
   adjusting a registration timer associated with a registration of the WCD on the wireless network based on the network quality, comprising:
   resetting the registration timer prior to an expiration of the registration timer upon detecting that remaining time on the registration timer is less than a threshold value and the network quality degrades.

2. The method of claim 1, wherein the registration is terminated when the registration timer expires.

3. The method of claim 1, wherein adjusting the registration timer comprises transmitting a registration request from the WCD to a network device that maintains the registration timer.

4. The method of claim 3, wherein the registration request comprises a registration timer length, and adjusting the registration timer comprises adjusting the registration timer in the network device based on the registration timer length in the registration request.

5. The method of claim 3, wherein determining the network quality comprises periodically monitoring the network quality at intervals substantially shorter than the registration timer, and adjusting the registration timer comprises transmitting the registration request when the network quality changes by a predetermined amount.

6. The method of claim 1, wherein determining the network quality comprises measuring a parameter of a wireless signal received by the WCD, the parameter being indicative of the network quality for the WCD, and wherein adjusting the registration timer comprises adjusting the registration timer based on the measured parameter.

7. The method of claim 6, wherein the parameter is indicative of a received signal strength of the received wireless signal.

8. The method of claim 1, wherein adjusting the registration timer comprises:
    setting the registration timer to a first value when the network quality resides within a first range; and
    setting the registration timer to a second value when the network quality resides within a second range.

9. The method of claim 1, wherein the adjusting the registration timer comprises:
    increasing a registration timer length of the registration timer when the network quality is above a quality threshold;
    decreasing the registration timer length when the network quality is below the quality threshold; and
    adaptively adjusting the registration timer by an amount proportional to a measured power of a received signal when a difference between a previously determined network quality and a currently determined network quality exceeds a difference threshold.

10. A device, comprising:
    a network quality module configured to determine a network quality for a wireless communication device (WCD) within a wireless network; and
    a registration module configured to adjust a registration timer associated with a registration of the WCD on the wireless network based on the network quality, comprising:
        resetting the registration timer prior to an expiration of the registration timer upon detecting that remaining time on the registration timer is less than a threshold value and the network quality degrades.

11. The device of claim 10, wherein the registration is terminated when the registration timer expires.

12. The device of claim 10, wherein the registration module is configured to interact with a transmitter to transmit a registration request from the WCD to a network device that maintains the registration timer to adjust the registration timer.

13. The device of claim 12, wherein the registration request comprises a registration timer length, the registration timer being adjusted in the network device based on the registration timer length in the registration request.

14. The device of claim 12, wherein the registration module is configured to periodically monitor the network quality at intervals substantially shorter than the registration timer, and to interact with the transmitter to transmit the registration request when the network quality changes by a predetermined amount.

15. The device of claim 10, wherein the registration module is configured to measure a parameter of a wireless signal received by the WCD, the parameter being indicative of the network quality for the WCD, and to adjust the registration timer based on the measured parameter.

16. The device of claim 15, wherein the parameter is indicative of a received signal strength of the received wireless signal.

17. The device of claim 10, wherein the registration module is configured to set the registration timer to a first value when the network quality resides within a first range, and to set the registration timer to a second value when the network quality resides within a second range.

18. The device of claim 10, wherein the registration module is configured to:
    increase a registration timer length of the registration timer when the network quality is above a quality threshold,
    decrease the registration timer length when the network quality is below the quality threshold, and
    adaptively adjust the registration timer by an amount proportional to a measured power of a received signal when a difference between a previously determined network quality and a currently determined network quality exceeds a difference threshold.

19. The device of claim 10, wherein the device is the WCD, the device further comprising:
    a wireless receiver configured to receive wireless signals via the wireless network; and
    a wireless transmitter that configured to transmit wireless signals via the wireless network.

20. A non-transitory machine-readable medium comprising instructions to cause a processor to:
    determine a network quality for a wireless communication device (WCD) operating on a wireless network; and
    adjust a registration timer associated with a registration of the WCD on the wireless network based on the network quality, comprising:
        resetting the registration timer prior to an expiration of the registration timer upon detecting that remaining time on the registration timer is less than a threshold value and the network quality degrades.

21. The machine-readable medium of claim 20, wherein the registration is terminated when the registration timer expires.

22. The machine-readable medium of claim 20, further comprising instructions to cause the processor to control a transmitter to transmit a registration request from the WCD to a network device that maintains the registration timer.

23. The machine-readable medium of claim 22, wherein the registration request comprises a registration timer length, and the network device adjusts the registration timer in the network device based on the registration timer length in the registration request.

24. The machine-readable medium of claim 22, further comprising instructions to cause the processor to periodically monitor the network quality at intervals substantially shorter than the registration timer, and control the transmitter to transmit the registration request when the network quality changes by a predetermined amount.

25. The machine-readable medium of claim 20, further comprising instructions to cause the processor to measure a parameter of a wireless signal received by the WCD, the parameter being indicative of the network quality for the WCD, and adjust the registration timer based on the measured parameter.

26. The machine-readable medium of claim 25, wherein the parameter is indicative of a received signal strength of the received wireless signal.

27. The machine-readable medium of claim 20, further comprising instructions to cause the processor to:
set the registration timer to a first value when the network quality resides within a first range; and
set the registration timer to a second value when the network quality resides within a second range.

28. The machine-readable medium of claim 20, further comprising instructions to cause the processor to:
increase a registration timer length of the registration timer when the network quality is above a quality threshold;
decrease the registration timer length when the network quality is below the quality threshold; and
adaptively adjust the registration timer by an amount proportional to a measured power of a received signal when a difference between a previously determined network quality and a currently determined network quality exceeds a difference threshold.

29. A wireless communication device (WCD), comprising:
means for receiving wireless signals via a wireless network;
means for determining a network quality for the WCD within the wireless network; and
means for adjusting a registration timer associated with a registration of the WCD on the wireless network based on the network quality, comprising:
resetting the registration timer prior to an expiration of the registration timer upon detecting that remaining time on the registration timer is less than a threshold value and the network quality degrades.

30. The device of claim 29, wherein the registration is terminated when the registration timer expires.

31. The device of claim 29, wherein the means for adjusting the registration timer comprises means for transmitting a registration request from the WCD to a network device that maintains the registration timer.

32. The device of claim 31, wherein the registration request comprises a registration timer length, and the means for adjusting the registration timer comprises means for adjusting the registration timer in the network device based on the registration timer length in the registration request.

33. The device of claim 31, wherein the means for determining the network quality comprises means for periodically monitoring the network quality at intervals substantially shorter than the registration timer, and means for adjusting the registration timer comprises transmitting the registration request when the network quality changes by a predetermined amount.

34. The device of claim 29, wherein the means for determining the network quality comprises means for measuring a parameter of a wireless signal received by the WCD, the parameter being indicative of the network quality for the WCD, and wherein the means for adjusting the registration timer comprises means for adjusting the registration timer based on the measured parameter.

35. The device of claim 34, wherein the parameter is indicative of a received signal strength of the received wireless signal.

36. The device of claim 29, wherein the means for adjusting the registration timer comprises:
means for setting the registration timer to a first value when the network quality resides within a first range; and
means for setting the registration timer to a second value when the network quality resides within a second range.

37. The device of claim 29, wherein the means for adjusting the registration timer comprises:
means for increasing a registration timer length of the registration timer when the network quality is above a quality threshold;
means for decreasing the registration timer length when the network quality is below the quality threshold; and
means for adaptively adjusting the registration timer by an amount proportional to a measured power of a received signal when a difference between a previously determined network quality and a currently determined network quality exceeds a difference threshold.

38. The method of claim 1, further comprising re-registering the WCD with the wireless network based on the registration timer.

39. The device of claim 10, wherein the registration module is configured to re-register the WCD with the wireless network based on the registration timer.

40. The machine-readable medium of claim 20, further comprising instructions to cause the processor to re-register the WCD with the wireless network based on the registration timer.

41. The device of claim 29, further comprising means for re-registering the WCD with the wireless network based on the registration timer.

* * * * *